United States Patent
Petri et al.

(10) Patent No.: US 9,106,167 B2
(45) Date of Patent: Aug. 11, 2015

(54) METHOD AND APPARATUS FOR DRIVING A SENSORLESS BLDC/PMSM MOTOR

(71) Applicant: MELEXIS TECHNOLOGIES NV, Tessenderlo (BE)

(72) Inventors: Viktor Petri, Erfurt (DE); Thomas Freitag, Plaue (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 190 days.

(21) Appl. No.: 14/013,674

(22) Filed: Aug. 29, 2013

(65) Prior Publication Data

US 2014/0062364 A1 Mar. 6, 2014

(30) Foreign Application Priority Data

Aug. 31, 2012 (EP) .................................. 12447018
Aug. 31, 2012 (GB) .................................. 1215576.8

(51) Int. Cl.
*H02P 6/18* (2006.01)
*H02P 6/00* (2006.01)

(52) U.S. Cl.
CPC ............... *H02P 6/182* (2013.01); *H02P 6/003* (2013.01)

(58) Field of Classification Search
CPC ........... H02P 6/182; H02P 6/142; H02P 6/14; H02P 2207/05; H02P 25/023; H02P 1/04; H02P 1/22; H02P 1/46; H02P 25/026
USPC ............... 318/400.34, 400.1, 400.26, 400.32, 318/254.1, 437, 444, 498
See application file for complete search history.

(56) References Cited

U.S. PATENT DOCUMENTS

| | | | | |
|---|---|---|---|---|
| 4,275,343 A | | 6/1981 | Fulton et al. | |
| 4,455,513 A | | 6/1984 | Fulton et al. | |
| 5,298,838 A | * | 3/1994 | Peters et al. | 318/400.32 |
| 6,462,491 B1 | * | 10/2002 | Iijima et al. | 318/400.34 |
| 6,901,212 B2 | * | 5/2005 | Masino | 318/400.35 |
| 6,995,530 B2 | * | 2/2006 | Biamonte et al. | 318/400.33 |
| 7,042,180 B2 | * | 5/2006 | Terry et al. | 318/400.21 |

(Continued)

FOREIGN PATENT DOCUMENTS

| | | |
|---|---|---|
| EP | 2037567 A2 | 3/2009 |
| GB | 2431302 A | 4/2007 |
| GB | 2484778 A | 4/2012 |

OTHER PUBLICATIONS

GB Search Report from corresponding GB Application No. 1215576. 8, Dec. 10, 2012.

(Continued)

*Primary Examiner* — Bentsu Ro
*Assistant Examiner* — Thai Dinh
(74) *Attorney, Agent, or Firm* — Workman Nydegger

(57) ABSTRACT

A method for driving a BLDC motor comprising at least three stator windings, comprising: a) determining a time period, and energizing during the time period two of the windings and leaving a third winding un-energized, based on a first motor state; b) measuring a first voltage representative for the back-EMF generated in the un-energized winding shortly before expiry of the time period; c) applying a commutation at expiry of the current time period; d) measuring a second voltage shortly after the commutation, and calculating a subsequent time period; e) repeating steps b) and c). An electrical circuit and a controller are provided for performing these methods.

13 Claims, 9 Drawing Sheets

(56) References Cited

U.S. PATENT DOCUMENTS

| | | |
|---|---|---|
| 7,737,651 B2 | 6/2010 | De Four |
| 7,944,159 B2 | 5/2011 | Paintz et al. |
| 8,212,508 B2 | 7/2012 | Paintz et al. |
| 8,487,565 B2 | 7/2013 | Dai |
| 2003/0062860 A1 | 4/2003 | Wu et al. |
| 2007/0018598 A1 | 1/2007 | Nichols |
| 2009/0096397 A1 | 4/2009 | Paintz et al. |
| 2012/0081046 A1 | 4/2012 | Dai et al. |
| 2012/0081050 A1 | 4/2012 | Dai |

OTHER PUBLICATIONS

GB Partial Search Report from corresponding GB Application No. 1215576.8, Mar. 28, 2013.

* cited by examiner

METHOD AND APPARATUS FOR DRIVING A SENSORLESS BLDC/PMSM MOTOR

FIELD OF THE INVENTION

The invention relates to the field of sensorless brushless direct current (BLDC) motors. In particular, the present invention provides a method and apparatus for starting and running such a motor.

BACKGROUND OF THE INVENTION

Brushless Direct Current (BLDC) motors are a type of electrical motor having multiple status phases (e.g. three or more) and a permanent magnet as a rotor (e.g. a bar magnet or a multi-pole magnet). BLDC motors do not use brushes for commutation, but instead they are electronically commutated. This implies, however, that the drive circuit must know the relative position of the rotor with respect to the stator, in order to direct the magnetic field for exerting torque on the rotor.

One kind of BLDC motors uses sensor devices such as e.g. optical sensor devices or Hall elements positioned around the rotor for determining the relative position using a resolver. This, however, has the disadvantage of increased complexity, extra component cost and decreased reliability, especially in harsh motor environments.

Another kind of BLDC motors does not use such sensors, but uses the back-EMF (BEMF) generated in the windings for determining the rotor position. The shape of BEMF can e.g. be trapezoidal or sinusoidal, depending on how the windings are located on the stator. The working principles of synchronous brushless DC motors based on back-EMF are well known and well described in the art, for example in U.S. Pat. No. 4,275,343 (filed in 1978, almost 35 years ago) and U.S. Pat. No. 4,455,513 (filed in 1982) and many others. Several of these other applications are based on integration of the back-EMF signal, or on the zero-crossing of the back-EMF signal for determining the relative rotor position. A disadvantage of such methods is that they require additional and often complex circuitry, such as e.g. integrators, comparators, filters, etc.

In U.S. Pat. No. 7,737,651B2, De Four discloses a principle for determining the rotor position based on space vector theory. Besides from being highly theoretical and complex, the execution of this algorithm requires a powerful DSP.

US20030062860 describes a control system operating with a PWM speed regulation of a sensorless BLDC motor with a plurality of windings, and a hybrid method utilizing BEMF induced in stator windings to indicate the commutation instant and a falling edge detection method to override PWM chopping and commutation noises. The circuit and software are alleged to be relatively concise and low cost. Yet, the control device includes an analog filter and a comparator for generating the BEMF zero crossing points (ZCP). Other functions such as detecting the falling edge of the generated ZCPs may be implemented in an integrated controller.

SUMMARY OF THE INVENTION

It is an object of embodiments of the present invention to provide a good method and device for driving a sensorless brushless DC (BLDC) motor, e.g. a sensorless permanent magnet synchronous motor (PMSM).

In particular, it is an object of embodiments of the present invention to provide a method and device for driving a sensorless brushless DC motor or a sensorless permanent magnet synchronous motor with reduced complexity.

It is an advantage of a method according to embodiments of the present invention that they are conceptually very simple.

It is an advantage of a method according to embodiments of the present invention that they can be implemented by relatively simple hardware and software.

This objective is accomplished by a method and a device according to embodiments of the present invention.

In a first aspect, the present invention provides a method for driving a sensorless brushless DC (BLDC) motor or a permanent magnet synchronous motor (PMSM) in a predetermined direction (e.g. clockwise or counter-clockwise), the motor comprising at least three stator windings connected in star configuration, and a permanent magnet rotor. The method comprises:

a) determining a time period as the current time period, and energizing during the current time period two of the windings and leaving a third winding un-energized for rotating the rotor in a predetermined direction, based on a first motor state of an energizing sequence, corresponding to a known rotor position;

b) measuring a first voltage representative of the back-EMF generated in the un-energized winding at a first time interval before expiry of the current time period;

c) applying a commutation at expiry of the current time period so as to energize at least two of the windings while leaving a third winding un-energized according to a subsequent motor state of the energizing sequence;

d) measuring a second voltage at a second time interval after the commutation, and calculating a subsequent time period based on at least the current time period and the measured first and second voltage; and e) repeating steps b) and c) after replacing the current time period by the subsequent time period.

It is an advantage of a method according to embodiments of the present invention that it can be implemented by very simple hardware and software, e.g. using a simple microcontroller with at least one analog-to-digital convertor. In this way complex and/or expensive hardware components such as e.g. analog filters, comparators, integrators, resolvers, etc, can be omitted. In addition, since no complex mathematical functions (such as e.g. goniometric functions) need to be calculated, a powerful processor such as e.g. a high-end DSP (digital signal processor) is not required, but instead a controller with a simple processing unit is sufficient. In this way the hardware and software can be simplified, and the design and implementation effort and complexity can be significantly reduced.

Whereas prior art methods go through large efforts to avoid missing the "ideal" moment of commutation, (which occurs at multiples of 60 degrees for a three-phase motor), methods according to the present invention simply accept the fact that a commutation event "shortly before or shortly after the ideal moment" is still a "very suitable" moment for many applications, such as e.g. fan control, oil-, fuel-, water- or air-pumps, blowers or compressors. Thus an underlying idea of the present invention is that the "exact" moment of commutation is less important than simplicity of the circuit. The only disadvantage is that the motor may develop a slightly lower average torque, and a slightly higher energy dissipation (e.g. 1 to 5%) as compared to prior art solutions. However, the benefits of simpler hardware and software far outweigh these disadvantages, e.g. in high-volume electronic applications, such as e.g. automotive applications, or in some harsh environments, where guaranteed and robust operation may be far more important than "smooth" rotation.

Moreover, a method according to embodiments of the present invention offers the advantage that it automatically takes into account any motor skew, while such skew should be explicitly corrected for in some known applications.

It is an advantage of embodiments of the present invention that continuous monitoring of the back-EMF voltage, e.g. by sampling the back-EMF multiple times per period (e.g. more than 2 times per period) is not required. Instead, a commutation is forced after an estimated time interval, the duration of which is calculated based on the duration of a previous time period, and on values of the back-EMF, measured at two specific time-instances, in particular shortly before and shortly after the preceding commutation event. Such method can be easily and efficiently implemented in an interrupt service routine, using timer-interrupts.

This method assumes that the rotor position is (approximately) known in step a), for which there are ways described in the prior art, for example in U.S. Pat. No. 7,944,159B2. It is noted that an exact angular position is not required, it suffices to know roughly how the rotor is oriented (e.g. with an accuracy of +/−15°). This can be assured at start-up e.g. by forcing the rotor in a desired position, and waiting for a sufficient time. This is also assured once the motor is running, because the motor is driven synchronously, i.e. the motor state is changed according to the actual rotor position, which can be determined by monitoring the back-EMF of the un-energized winding.

The underlying idea behind embodiments of the method is that the difference between the first and second value (measured resp. before and after the commutation event) can be used to correct the timing of the commutation events, because ideally, there is no difference.

The first time interval is preferably chosen as small as possible (ideally zero). The second time interval should be chosen sufficiently large in order that a valid BEMF-signal is read, and any transient behavior due to the commutation events (current decay, spikes) have died out. This period may vary with motor speed, but can be dynamically determined in software. It may be pre-determined (e.g. using a look-up table), but preferably is dynamically determined by monitoring the feedback-signal, and by ignoring invalid data.

In a method according to embodiments of the present invention, the first time period in step a) may have a predetermined value, e.g. a constant value independent of the motor speed.

This can be seen as open-loop motor control, whereby the timing of one or more commutations is predetermined. As will be described further, only a single open-loop period may suffice, in contrast to some prior art methods, where open-loop control is applied up to about 20% of the nominal motor speed.

In such method, the first time period in step a) may be determined by monitoring a voltage representative of the back-EMF generated in the un-energized winding, and by determining the first time period as the time instance when that voltage reaches a local extreme (local maximum or a local minimum).

In this way the first time period may be dynamically determined, which may take better account of e.g. an external load.

In a method according to embodiments of the present invention, each subsequent time period may be calculated based on the preceding time period by using a formula that is directed at reducing the difference between the first and the second voltage before and after the subsequent commutation.

In a method according to embodiments of the present invention, the second time period immediately following the first time period immediately after motor start-up may be calculated according to the formula:

$$T_2 = T_1 * \left(1 - \frac{1}{A} * \frac{v_1(1) - v_2(1)}{v_1(1)}\right);$$

wherein T2 is the second time period, T1 is the first time period, v1(1) is the first voltage measured before the first commutation and v2(1) is the second voltage measured after the first commutation, and 1/A is a predetermined value in the range of 0.25 to 0.75.

This formula can be used to calculate the duration of the second time period after motor start-up. Alternatively, a second predetermined (constant) time-period may also be used. As can be seen, this formula uses the value of the previous time-period, and two measurement values "around" the first commutation, thereby immediately correcting the first previous time-period.

In embodiments of the present invention, the value of 1/A may lie in the range of 0.40 to 0.60. In particular embodiments, the value of 1/A may lie in the range of 0.45 to 0.55. In embodiments, the value of 1/A may be about ½.

In a method according to embodiments of the present invention, the subsequent time period may be calculated according to the formula:

$$T(n+1) = T(n) * \left(1 - \frac{1}{A} * \frac{v_1(n) - v_2(n) - 2*v_2(n-1)}{v_1(n) - v_2(n-1)}\right);$$

wherein T(n) is the subsequent time period, T(n−1) is the current time period, v1(n) and v2(n) is the first resp. second voltage measured before and after the most recent commutation, and v2(n−1) is the second voltage measured after the commutation preceding the most recent commutation, and 1/A is a predetermined value in the range of 0.25 to 0.75.

By using this simple formula, the duration of the motor cycle can be determined based on the previous time period and only three voltage measurements.

It is to be noted that the formula for the second time-slot can be seen as a special case of the general formula presented here, when taking zero for the second value of the previous commutation. Thus only a single formula needs to be implemented in the controller, thereby reducing complexity.

In embodiments of the present invention, the value of 1/A may lie in the range of 0.25 to 0.75. In embodiments, the value of 1/A may lie in the range of 0.40 to 0.60. In embodiments, the value of 1/A may lie in the range of 0.45 to 0.55. In embodiments, the value of 1/A may be about ½.

In a method according to embodiments of the present invention, the energizing of at least one of the windings may be operated at least part of the time using a PWM-signal.

It is an advantage of using a PWM-signal for energizing the windings during at least part of the time-slot between two commutation events, in that it allows the motor speed to be controlled by simply adapting the PWM-duty-cycle, without having to adapt the supply voltage. This can be implemented with only minimal processing load (e.g. only activating and deactivating the PWM-module).

However, in order not to disturb the measurement of the first voltage before the commutation, it may be good to stop energizing with the PWM-signal well before taking that measurement.

In a method according to embodiments of the present invention, the energizing of the windings may be operated at least part of the time using DC voltages (such as VDD, GND).

It is an advantage of using a DC voltage for energizing the windings during at least part of the time-slot between two commutation events, in that it allows a large motor torque to be exerted upon the motor, which reduces the risk of the motor being blocked. Such energizing signals do not disturb the measurement of the first voltage before the commutation, and may thus be applied while taking that measurement.

In a second aspect, the present invention provides an electrical circuit as can be used for performing one of the methods according to embodiments of the first aspect, the electrical circuit comprising:

a BLDC motor or a PMSM motor, the motor comprising at least three stator windings connected in star configuration and a permanent magnet rotor;

a controller connected to the motor, the controller comprising:

at least three output pins connected to the windings of the motor for energizing at least two of the windings and for leaving a third winding un-energized;

at least four input pins connected to the windings of the motor for measuring the voltage representative of the back-EMF generated in the un-energized winding, and connected to a reference signal;

at least one analog to digital convertor (ADC) for digitizing the measured voltage and for digitizing the reference signal;

a calculation unit (10);

wherein the controller is provided with an algorithm for performing the method according to any of the method embodiments.

It is an advantage of such a circuit that, apart from an optional output buffer stage for delivering power to the motor, and an optional voltage divider stage for reducing the voltage to the input pins, and an optional resistor stage for generating a virtual star point, and a voltage divider for generating the half supply voltage, it does not require complex analog circuitry, such as e.g. an analog filter, an analog integrator, comparators or a resolver, etc.

Suitable controllers are e.g. programmable digital or hybrid micro-controllers, but can also be made as dedicated ASICs (application specific ICs).

In a third aspect, the present invention provides a programmable controller as can be used in the electrical circuit embodiment cited above, comprising:

the at least three output pins;

the at least four input pins;

the at least one analog to digital convertor;

the calculation unit;

a memory containing program code executable by the calculation unit and adapted for performing the method embodiments.

It is an advantage of using such a programmable controller, that practically all of the functionality (except for the power output stage and voltage divider, which are optional) can be implemented in a single device.

It is advantageous to use a programmable micro-controller because it offers high flexibility of developing and testing the program. The micro-controller may be a so-called digital micro-controller, or may be a hybrid micro-controller comprising also motor driver circuitry such as a power output stage. It is an advantage that such devices are commercially available with many options (e.g. in terms of memory, flash, processor speed, number of ADC's etc), are qualified for harsh environments (e.g. automotive environment), are mature, have existing development environments, etc. This again simplifies the implementation and testing effort and risks.

A programmable controller according to embodiment of the present invention may further comprise a timer module.

In a fourth aspect, the present invention provides a computer program product for executing any of the method embodiments of the present invention, when executed on a controller associated with a sensorless brushless DC (BLDC) motor or a permanent magnet synchronous motor (PMSM) comprising at least three stator windings connected in star configuration and a permanent magnet rotor. Such computer program product can be tangibly embodied in a carrier medium (machine readable data storage) carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

Figure 1:
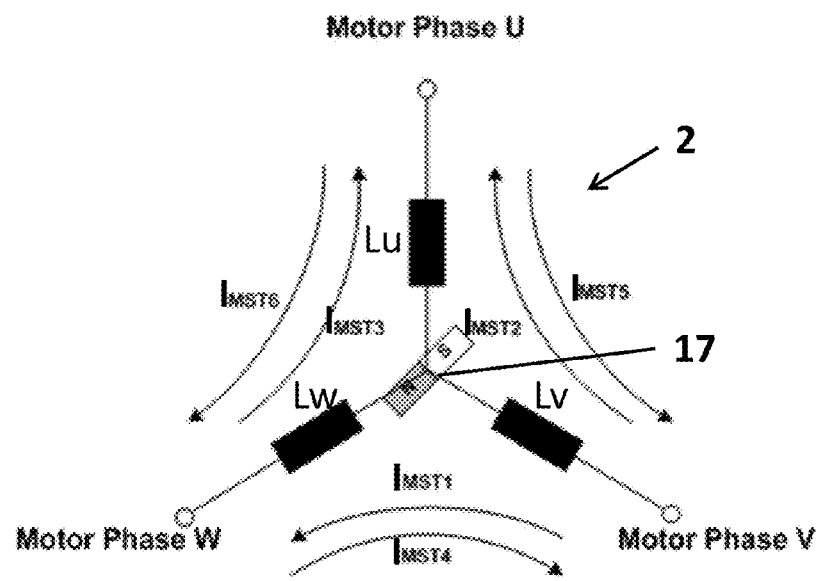
FIG. 1 shows a schematic representation of a three-phase, star connected BLDC stator and a two-pole permanent magnet rotor.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

FIG. 1 shows a schematic representation of a motor 2 comprising a three-phase, star connected brushless direct current (BLDC) stator and a two-pole permanent magnet rotor 17. The rotor 17 is indicated as a bar magnet having a north and south pole. The stator comprises three windings connected at one end to a so called "star" point, the other ends (also called terminals) being accessible, e.g. for being driven by a controller 3 (not shown in FIG. 1). The stator windings are represented by inductances Lu, Lv, Lw. In practice the windings L also have an electrical series resistance R, but these are not shown here, and are of no importance for the yeast of the present invention. In this application, the notations U, V, W are used for indicating both the terminals, as well as the voltage applied to those terminals. The voltages between the terminals and the star point, also called "phase voltages" could be denoted by Vun, Vvn and Vwn, N being the voltage at the star point.

Referring back to FIG. 1, the motor 2 can be driven by applying voltage waveforms to some or all of the terminals U, V, W, so that a current can flow through the windings. In brushless sensorless DC (BLDC) motors, however, it is common to apply a voltage only to two of the three terminals, and to leave the third terminal unconnected for measuring a back electromagnetic force (also referred to as: Back EMF, or BEMF). In that way, two of the windings are energized, and the third winding is left un-energized (also called "tri-state"). For example, when VDD is applied to terminal V, and GND is applied to terminal W, a current as indicated by arrow Imst1 will flow through the windings Lv and Lw, while a back-EMF would be generated in the winding Lu, which can be measured at terminal U. This is well known in the art, and further details can be found in literature.

The shape of BEMF can e.g. be trapezoidal or sinusoidal, depending on how the windings are located on the stator. A trapezoidal BLDC motor can be driven by applying alternately the supply voltage VDD to one of the windings, and the ground voltage GND to another of the windings, while leaving the third winding open (tri-state), during a certain time period (further also referred to as "time-slot"). Instead of applying the supply voltage, a pulse-width modulated PWM-signal can also be applied. An advantage of driving the terminals with a DC voltage and/or a PWM signal, as compared to sinusoidal signals, is that DC signals and PWM signals can be generated more easily in a controller 3, and do not require significant processing power, and/or tables stored in memory, and/or interpolation routines.

It is explicitly mentioned that the present invention is not only valid for block mode or trapezoidal mode commutation, but also works for sine wave controlled motors e.g. PMSM motors. Even though in sine wave controlled motors usually all three motor terminals are permanently driven, it would look like BEMF measurements would in first instance not be possible. However, by applying a very small interruption of the driving, the BEMF can be measured and monitored, and then the principles of the present invention can be applied. For further information with respect to interruption of driving, reference is made to EP2037567.

Although PWM signals can also be used in the present invention, the invention will be described using DC-signals.

FIG. 1 shows six arrows, indicated as Imst1 to Imst6, representing the current flowing through the windings in each of six possible motor states MST1 to MST6, as listed in table 1.

TABLE 1

| Motor state | Rotor position [°] | Phase U | Phase V | Phase W |
|---|---|---|---|---|
| MST1 | 0 ... 60 | tri-state | VM | GND |
| MST2 | 60 ... 120 | GND | VM | tri-state |
| MST3 | 120 ... 180 | GND | tri-state | VM |
| MST4 | 180 ... 240 | tri-state | GND | VM |
| MST5 | 240 ... 300 | VM | GND | tri-state |
| MST6 | 300 ... 360 | VM | tri-state | GND |

With rotor position is meant the relative rotor position with respect to the stator windings. When the motor supply voltage VM is applied to terminal V, and ground GND is applied to terminal W, a current will flow as indicated by the arrow Imst1, corresponding to motor state MST1. This current will generate a magnetic field which will exert a torque on the rotor 17 for moving the rotor such that the magnetic field of the rotor will align with the magnetic field generated by the stator windings. For continuous rotation of the rotor, the voltages applied to the terminals should be dynamically adjusted synchronously with the rotor movement. This can be achieved by changing the motor states in a predefined sequence: MST1, MST2, MST3, etc. Changing from one motor state to the other, by changing the voltages applied to the terminals, is called "commutation".

A similar table (not shown), whereby the second column is 180° phase shifted, would be used for rotating the motor in the opposite direction, whereby the sequence would be: MST3, MST2, MST1, etc.

Figure 2:
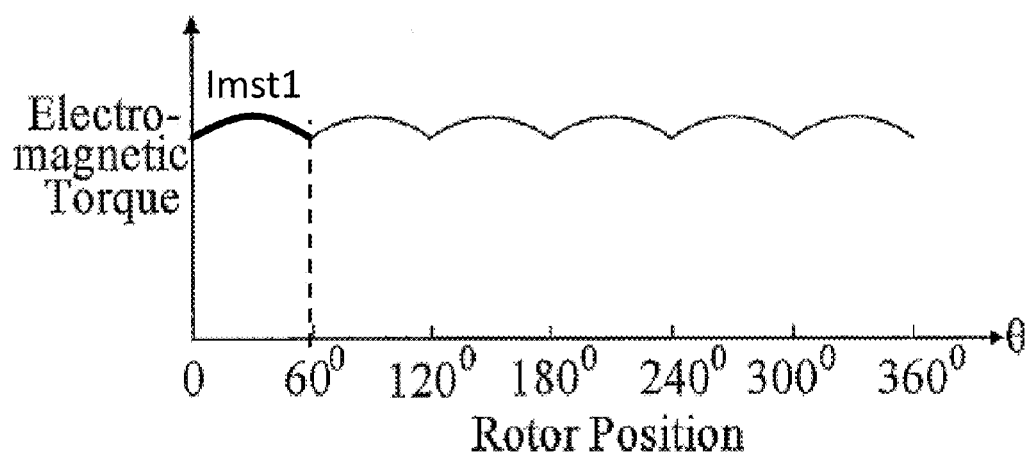
FIG. 2 shows the ideal torque waveform exerted on the rotor in case of commutation at multiples of 60 degrees for the motor shown in FIG. 1.

As is known in the art, for a stator with three phase windings, oriented at 120° angular distances, the commutations should ideally occur at angular rotor intervals of 60°, for maximizing the torque exerted upon the rotor 17. FIG. 2 shows the (ideal) torque waveform exerted on the rotor in such a case. The torque exerted on the rotor during a first motor phase MST1 is indicated by a thick line. As can be seen, in order to follow the maximum-torque waveform indicated in FIG. 2, a commutation should take place at multiples of 60°.

The challenge that the present invention tries to solve is to find a suitable but less complex method, and suitable but less complex circuitry for driving such a sensorless BLDC motor, even if the operation conditions may not be optimal at all times. Such a controller may not be suitable for all motor applications (such as e.g. robotic movement, where precise positioning and precise accelerations are of prime importance), but can certainly be used in some other applications where reliability and simplicity are more important than precise predictable behavior, or in applications where the start-up behavior is less important than the nominal behavior. Such an application is e.g. fan control in automotive application, where the motor load is negligible at start-up, and gradually increases as the fan speed increases. Other suitable applications are e.g. oil-pumps, fuel-pumps, water-pumps, air-pumps, blowers, compressors, etc.

Figure 3:
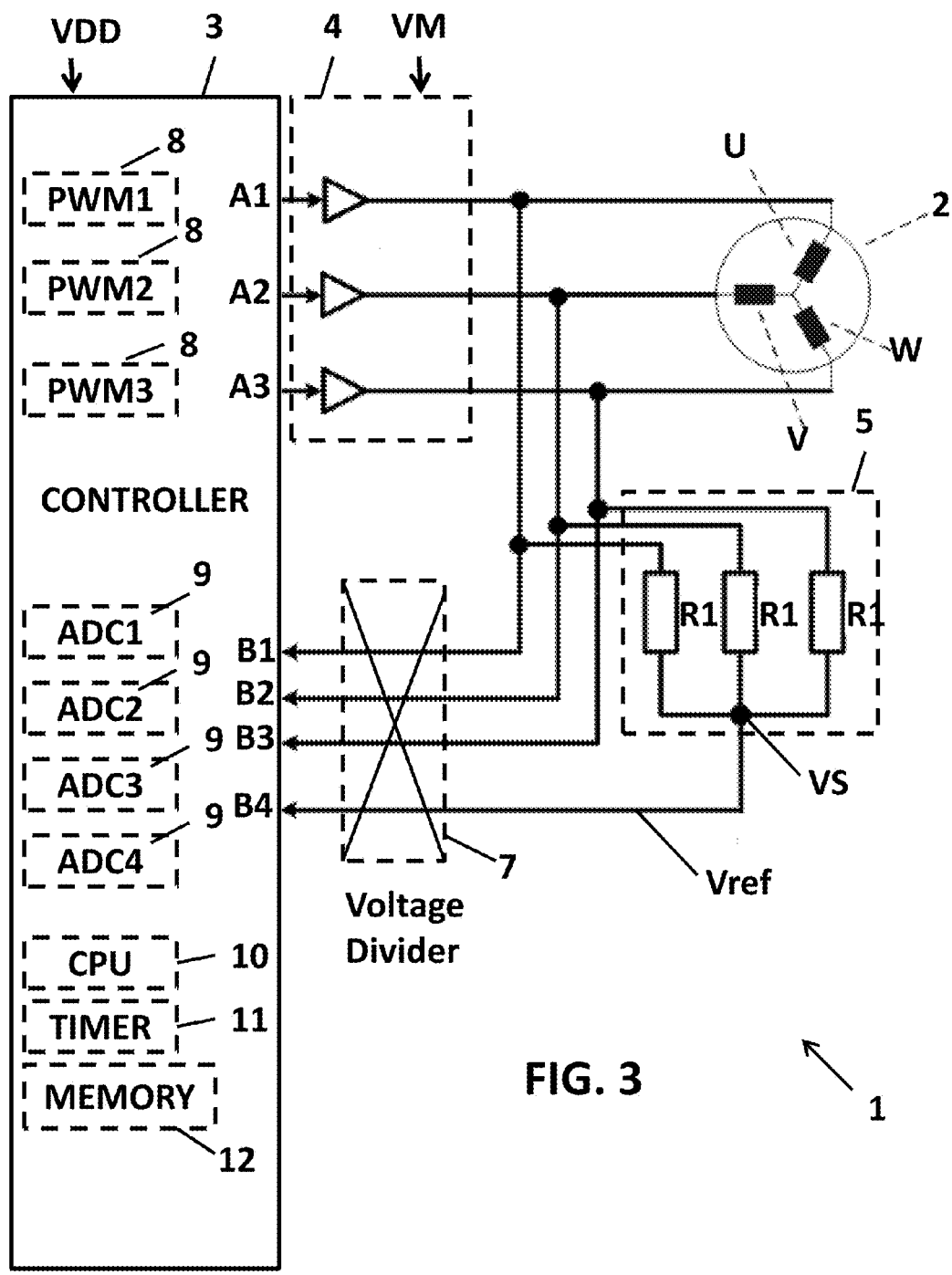
FIG. 3 shows an embodiment of an electrical circuit for controlling a brushless and sensorless BLDC motor shown in FIG. 1, according to aspects of the present invention.

FIG. 3 shows an example of an electrical circuit 1 according to embodiments of the present invention, for controlling a brushless and sensorless BLDC motor. (In FIG. 5B a more complete circuit will be shown). The electrical circuit 1 comprises a motor 2, illustrated here schematically as a BLDC motor, but the invention also works for a PMSM motor. The electrical circuit further comprises a controller 3, e.g. a digital controller without an analog buffer stage, or an integrated hybrid controller including an analog buffer stage.

The controller has outputs A1, A2, A3 for outputting energizing signals for energizing at least two of the motor windings, and inputs B1, B2, B3 for receiving monitor signals for monitoring the un-energized winding.

Figure 5A:
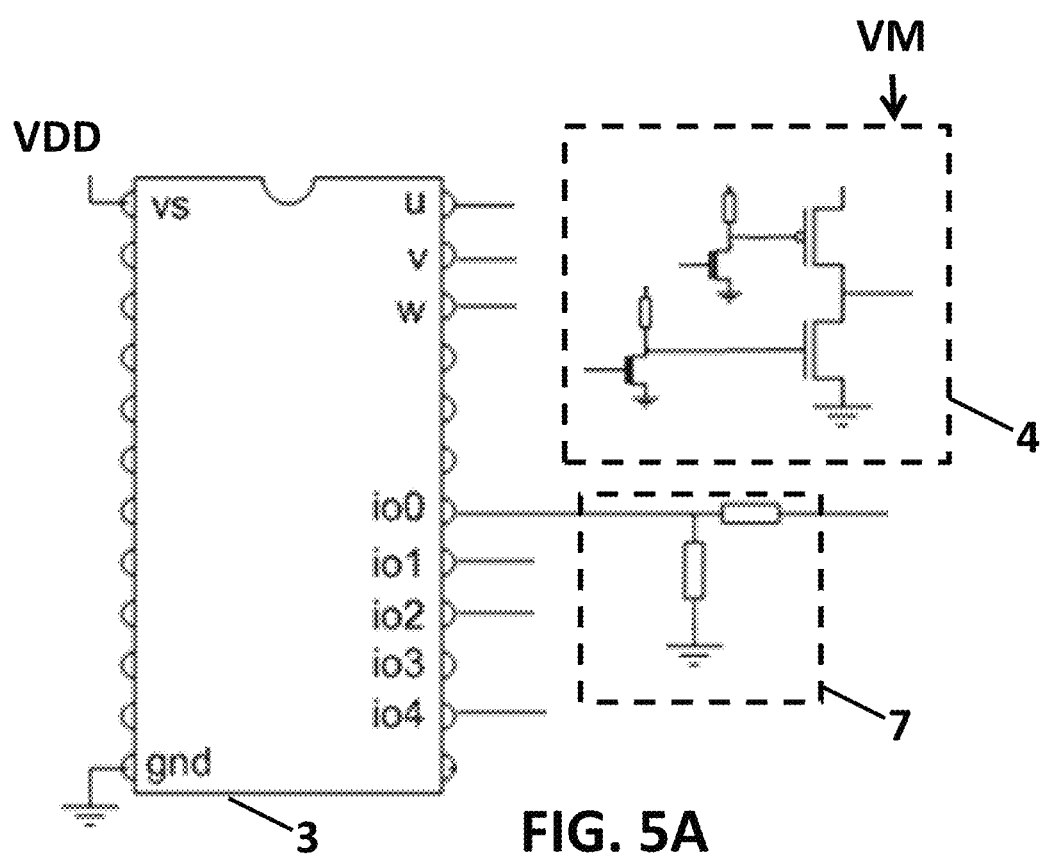
FIG. 5A shows an example of an integrated controller as can be used in the electrical circuit of FIG. 3 and FIG. 4, according to aspects of the present invention.

The electrical circuit 1 may optionally further comprise a buffer stage 4 connected between the controller 3 and the motor 2, for providing power to the phase windings U, V, W, in case the current drive capacity of the controller 3 is insufficient. FIG. 5A shows one example of an external buffer stage 4 comprising an external H-bridge consisting of two FET transistors connected between motor voltage supply VM and ground GND. Buffer circuits 4 are known in the art, and need not be described in more detail here. Other buffer circuitry known to the skilled person can also be used. It is to be noted that the motor voltage supply VM may be the same as, or different from the supply voltage of the motor controller VDD.

Referring back to FIG. 3, the electrical circuit 1 may optionally further comprise a voltage divider 7 for limiting the voltage levels to the inputs B1, B2, B3 of the controller 3. A simple voltage divider consisting (for each signal) of two resistors is shown in FIG. 5A. However, such a voltage-divider 7 can be omitted for applications where the signal levels are sufficiently low, e.g. when the motor 2 is directly powered by the controller 3 using e.g. 5V or 12V signals, without an external buffer stage 4.

Referring back to FIG. 3, the electrical circuit 1 may optionally further comprise circuitry 5 for generating a virtual star voltage VS, which can be used as a reference signal Vref to the controller 3, and can be measured e.g. via a fourth input B4.

Figure 4:
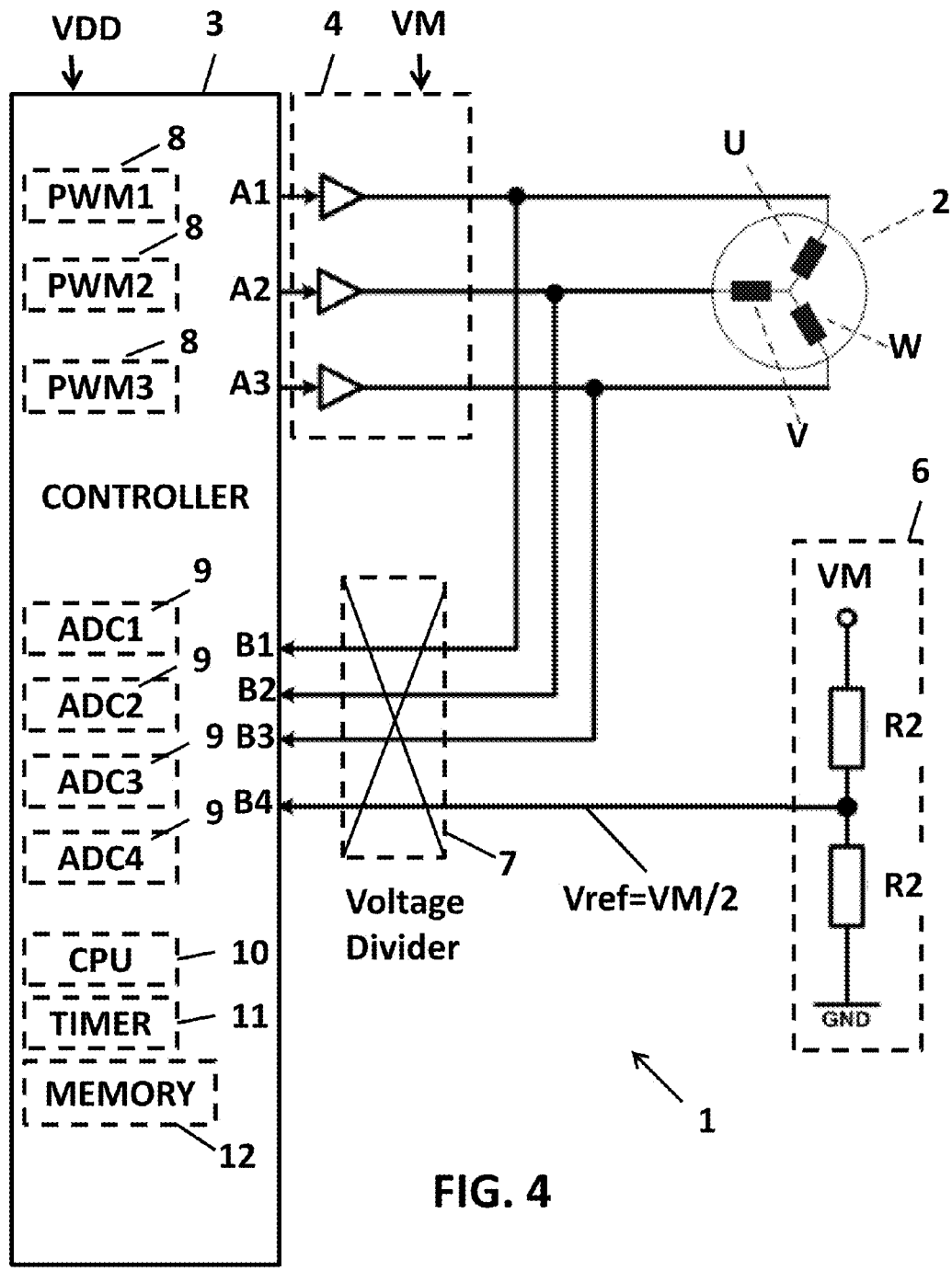
FIG. 4 shows another embodiment of an electrical circuit for controlling a brushless and sensorless BLDC motor shown in FIG. 1, according to aspects of the present invention.

FIG. 4 shows an alternative electrical circuit 1 which can be used for controlling the motor 2 according to aspects of the present invention. It is identical to that of FIG. 3, except that it comprises circuitry 6 for generating a reference voltage Vref equal to half of the motor supply voltage VM/2, and in that the three resistors R1 for the virtual star point can be omitted. The voltage VM/2 may also be provided in other ways, e.g. by using a power supply providing such voltage directly, in which case the voltage divider 6 can be omitted.

In an embodiment of the electrical circuit 1, the controller 3 comprises four analog-to-digital convertors (ADC) 9, three of which are operatively connected to the phase windings U, V, W, for measuring a voltage representative of the back-EMF voltage, which is present on one of the input lines, depending on the motor state being applied. The fourth ADC is operatively connected to the resistor circuitry 5 or the resistor circuitry 6 for receiving the reference voltage. Instead of using four ADC's, it may also be possible to use only a single ADC, and to internally route one of the signals from the respective input pins B1, B2, B3 or B4 to that single ADC, because they are not needed at the same time, as will be explained further. Of course, using two ADC's and routing the input pins (e.g. two at the time) thereto is also possible.

FIG. 5A shows an example of a digital controller 3, or a hybrid controller 3, as can be used in the electrical circuit of FIG. 3 and FIG. 4.

Figure 5B:
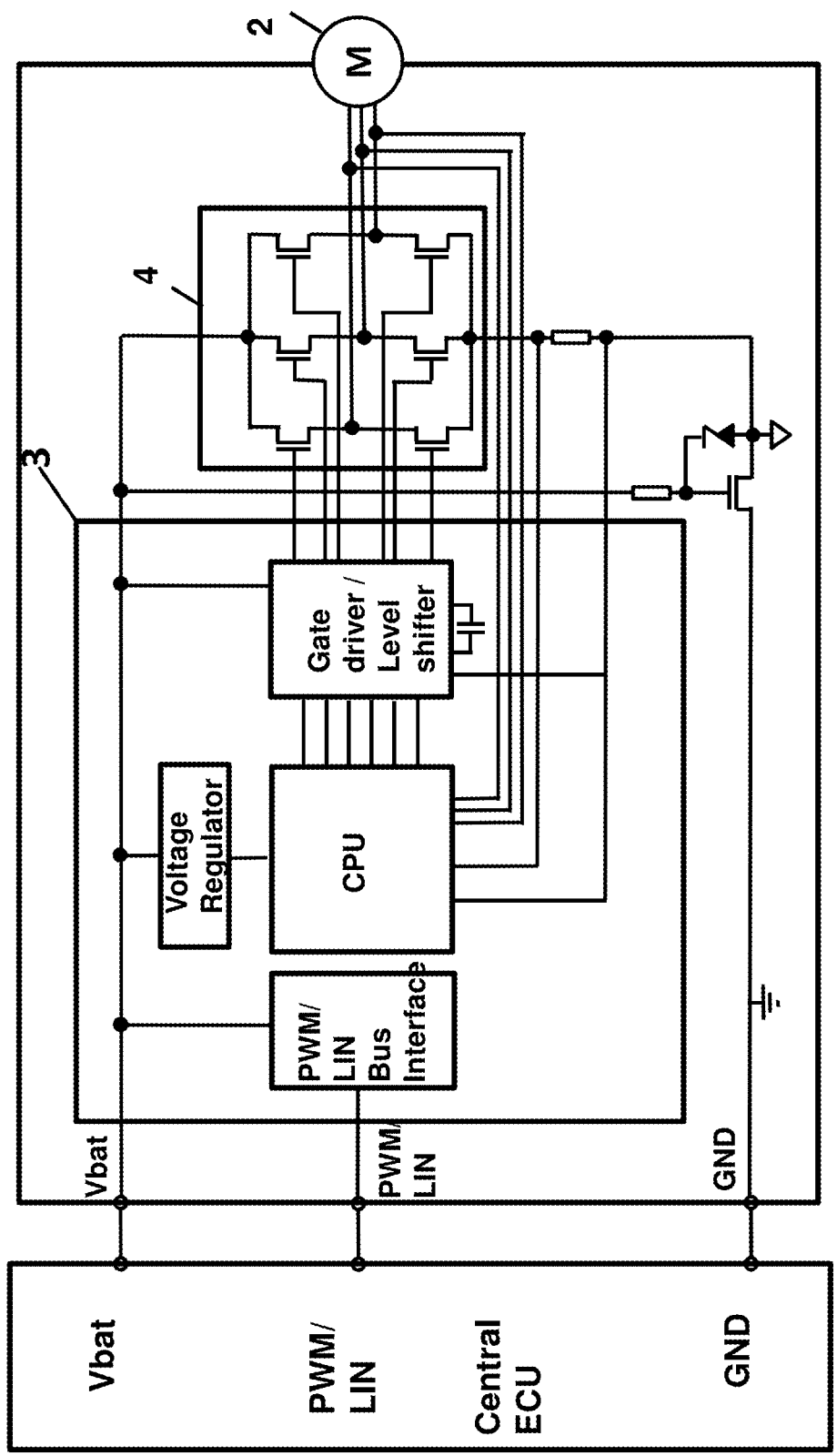
FIG. 5B shows another example of an electrical circuit according to aspects of the present invention, the circuit comprising a Central ECU, an integrated controller for performing the commutations, and a power drive stage connected to a BLDC motor.

FIG. 5B shows a complete system comprising an electrical circuit according to aspects of the present invention. The system of FIG. 5B comprises a Central ECU which may e.g. determine the speed at which the motor is to run, and communicates this speed via a PWM-signal or a LIN-signal to an integrated controller 3 for performing the commutations, which outputs control signals for the power drive stage 4 for generating the voltage signals U, V, W which are applied to the BLDC motor 2. In this example the supply voltage VDD of the integrated controller 3 and the motor supply voltage VM applied to the power stage are the same, and are equal to Vbat.

Figure 6:
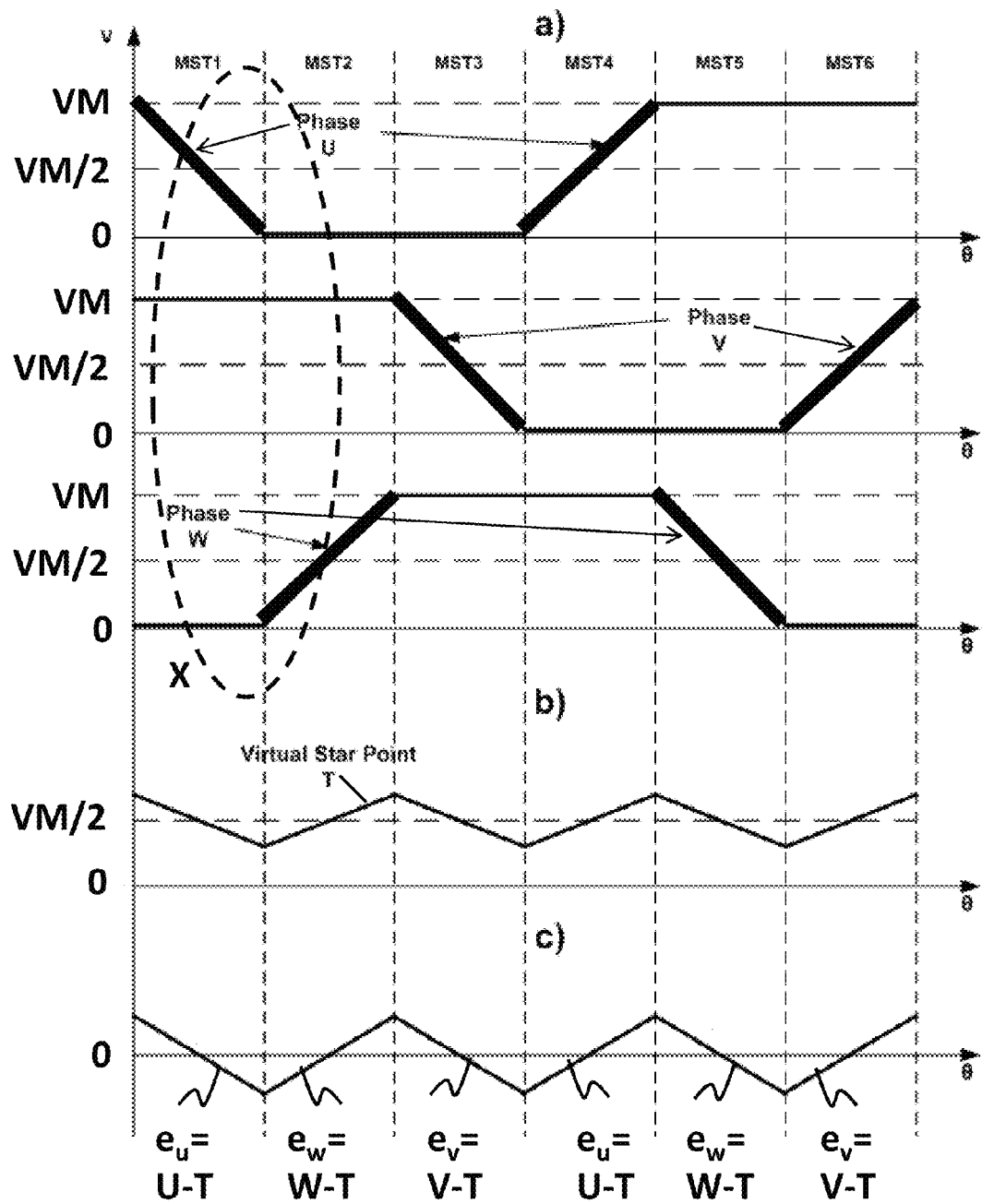
FIG. 6 shows an example of waveforms corresponding to the circuit of FIG. 3.

FIG. 6 shows an example of voltage waveforms as can be used/encountered during the operation of the BLDC motor shown in FIG. 1 using the circuit of FIG. 3. In FIG. 6a the three motor phases and the corresponding voltage levels U, V, W for one electrical rotation are depicted. For example, in the first motor state MST1, phase U is tri-state, phase V is connected to the supply voltage VDD and phase W is connected to ground GND. This voltage vector results in a current flow from phase V to phase W. A falling voltage slope is present on phase U, carrying the position information of the rotor 17. After the commutation event, MST2 is applied to the stator windings. The current starts to flow from phase V to phase U and a rising slope is present on motor phase W. This working is very well known in the art. In FIG. 6b the voltage of virtual star point 9 is depicted showing the same tendency as the tri-state motor phase (U in MST1, W in MST2, etc), but with different amplitude. The subtraction of the virtual star point voltage T from the tri-state phase voltage (U in MST1, etc) provides a voltage representative for the BEMF, as can be seen in FIG. 6c. A saw-tooth shape waveform shows the BEMF voltage when the rotor is running synchronous to the stator flux. Thus by monitoring the signals U (as un-energized phase winding) and T (virtual star point as reference voltage) during MST1, the signals W and T during MST2, etc, the back-EMF signal can be calculated. The waveforms of FIG. 6 corresponds to the signals in the circuit of FIG. 3.

Figure 7:
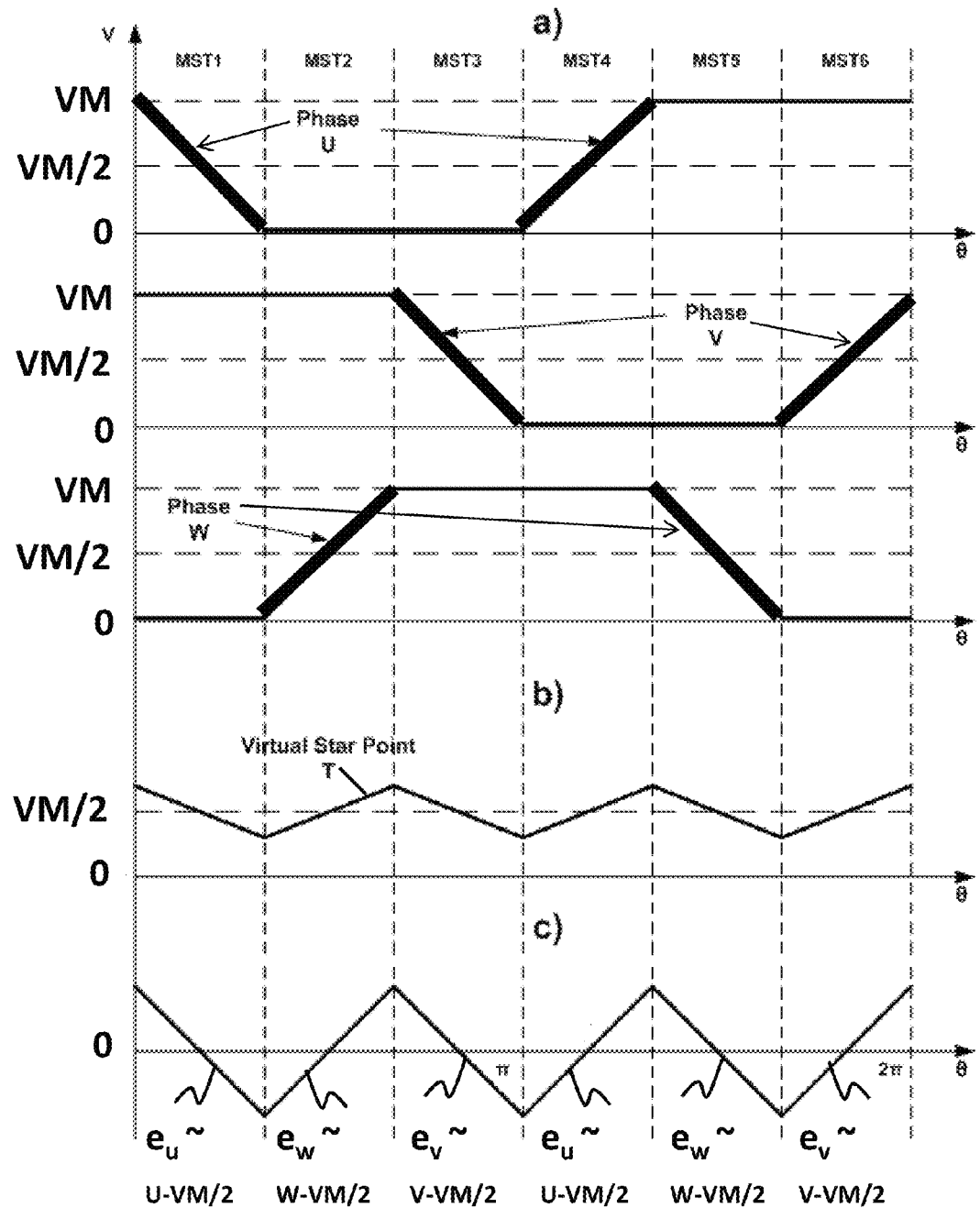
FIG. 7 shows an example of waveforms corresponding to the circuit of FIG. 4.

FIG. 7 shows an example of voltage waveforms as can be used/encountered during the operation of the BLDC motor shown in FIG. 1 using the circuit of FIG. 4. They are very similar to the signals of FIG. 6, except that half the motor supply voltage VM/2 is used as reference voltage, instead of the virtual star point voltage T in FIG. 6. Also the subtraction of half the motor supply voltage VM/2 from the tri-state phase voltage (U, V or W, depending on the motor state) provides a signal eu, ev, ew which is proportional to the BEMF in the tri-state phase, as shown in FIG. 7c.

Figure 10:
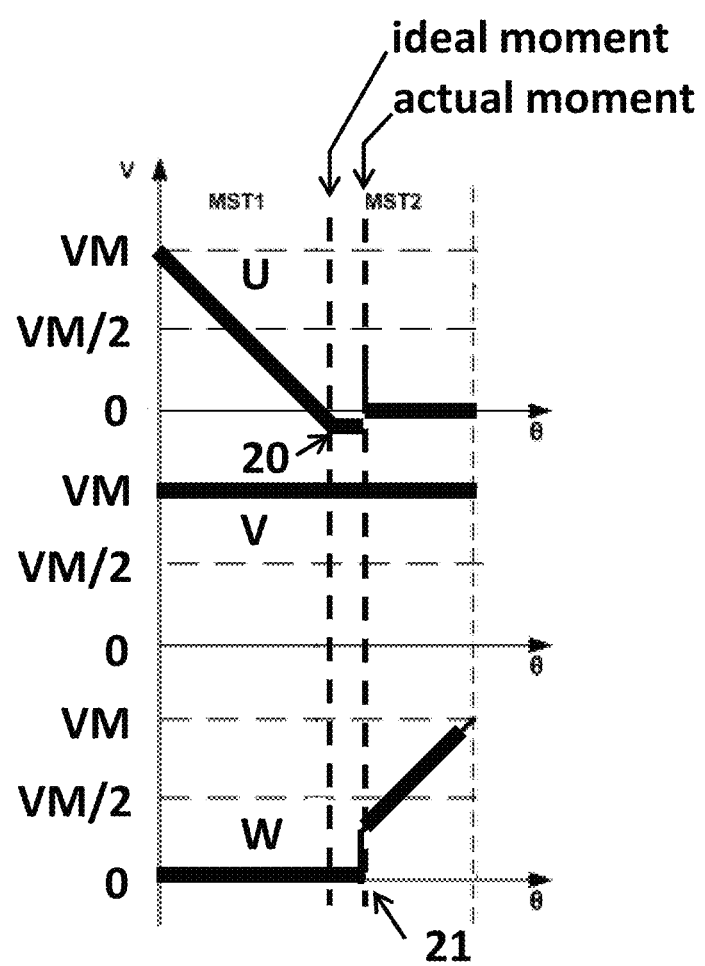
FIG. 10 shows an enlarged portion of part of the waveforms shown in FIG. 6.

While the waveforms of FIGS. 6 and 7 are ideal waveforms, the inventor has observed that the motor still works in a satisfactory way, even when the commutations are not performed on the ideal moments (i.e. at multiples of 60°), but close to these moments. In particular, the inventor has observed what would happen with the tri-state signal U of FIG. 6 in MST1, if the commutation for MST2 occurs "too late" (i.e. "later than in the ideal case"), which means that V is maintained at VM "too long" and W is maintained at GND "too long". As can be seen from FIG. 10, what happens is that the U-signal reaches a minimum (indicated by arrow 20) and starts increasing again. Likewise, in MST2 the voltage of the un-energized phase voltage W will gradually increase from GND to VM, but when the voltages of phase MST2 are maintained "too long" (i.e. longer than the ideal moment), the phase voltage W will start decreasing again. When the commutation is then applied (albeit "too late"), the inventor has observed that the BEMF-signal makes a sudden jump. It is noted that this "jump" is different from any transient behavior caused by current decay due to the commutation event itself, but is due to the fact that the rotor has turned beyond the ideal angle, before the commutation is applied. A jump will also occur when the commutation is performed "too soon". These observations are the basis of embodiments of a method according to the present invention, as will be described further in relation to FIG. 8.

Figure 8:
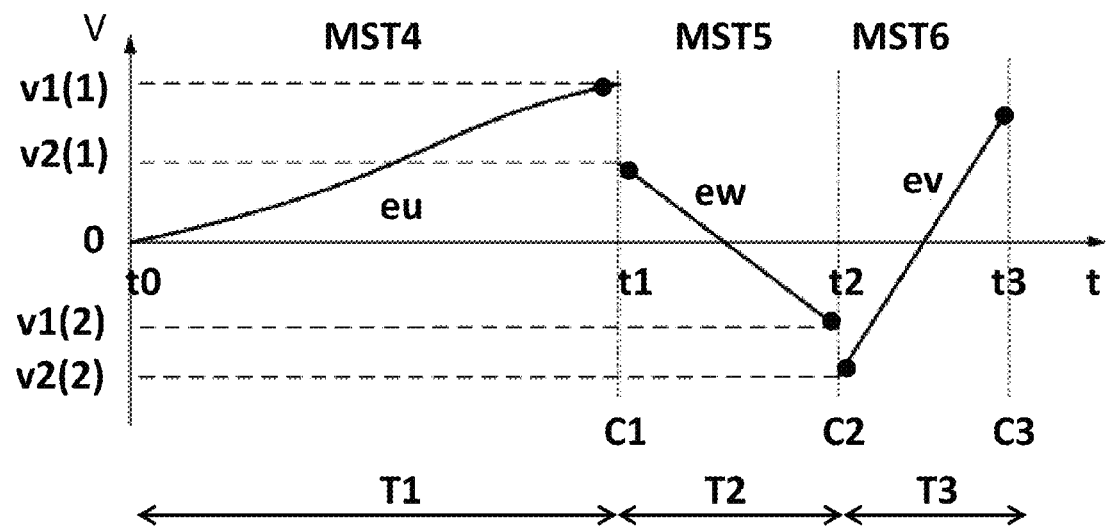
FIG. 8 shows an example of a possible behavior of the BEMF voltages after start-up of a BLDC motor, according to an embodiment of the present invention.

Referring now to FIG. 8, assume that the rotor 17 is forced to a known position before actual start-up, by applying one of the motor states (e.g. MST3), and waiting for a sufficiently long time until the rotor 17 has aligned itself with the stator field (as is known e.g. from U.S. Pat. No. 7,737,651B2). In this way it can be assured that the motor will subsequently start rotating in the desired direction. Suppose in this example that the rotor is located between 180° and 240° electrical before t0. As a consequence (see Table 1 above) voltages according to the motor state MST4 are applied to the stator windings at time t0 during a predetermined time period T1, e.g. by applying voltage VM to the winding W, applying GND to the winding V, while leaving the winding U un-energized. Then a first commutation is performed at t=T1. In practice the use of a predetermined time period T1 for the first motor cycle MST4 gives acceptable results, e.g. in applications such as fan-control, where the inertia of the rotor is known, and the load is negligible at start-up, thus the acceleration is very predictable. For applications where a constant time period T1 would not be acceptable, monitoring (e.g. polling) the back-EMF signal eu of the un-energized winding until it reaches a local maximum or minimum, and then applying the commutation, could also be applied. However, shortly before the first commutation at t1, e.g. at a first time interval ΔT1 before t1, the BEMF-signal "eu" is measured, resulting in the value v1(1), and shortly after the first commutation at t1, e.g. a predetermined second time interval ΔT2 after t1 the BEMF-signal "ew" is measured, resulting in the value v2(1). (the notation v1(.) will be used for the measurement before, and v2(.) will be used for the measurement after the commutation. The number of the commutation is indicated between the brackets, thus, as an example, v1(3) is the measurement before the third commutation). Thus although the second period (also called motor cycle) MST5 is already started, its period T2 is not determined yet. That period T2 will then be calculated, based on the time period T1 of the previous motor cycle MST4, and based on the measured values v1(1) and v2(1) of the BEMF "just before" and "just after" the first commutation C1, by using the following formula:

$$T_2 = T_1 * \left(1 - \frac{1}{2} * \frac{v_1(1) - v_2(1)}{v_1(1)}\right) \qquad [1]$$

In fact, this is a simplified form of a more general formula described below, applicable only at start-up. When v1(1) is larger than v2(1), it means that the commutation was done "too late", thus the next period T2 needs to be shorter than the previous period T1. Indeed, if v1(1) is larger than v2(1), the number after the minus-sign is positive, thus T2 will be smaller than T1 by a number proportional to the "jump" and inversely proportional to the "maximum value".

The time t2 at which the motor state MST5 should end, and the second commutation should occur, is then calculated as t2=T1+T2. When the time t has reached t2, which can e.g. be efficiently implemented by making use of a timer-interrupt, (but other techniques such as "polling", or "delay functions by counting to a certain number" may also be used), the second commutation C2 will be executed, and the voltages of the subsequent motor state MST6 (see table 1) will be applied to the motor windings U, V, W. However, as before, slightly before the second commutation C2 at time t2 took place, the BEMF-signal "ew" is measured as v1(2), and slightly after the second commutation C2 at t2, the BEMF-signal "ev" is measured as v2(2), and the time period of the third time-slot T3 is calculated using the formula:

$$T_3 = T_2 * \left(1 - \frac{1}{2} * \frac{v_1(2) - v_2(2) - 2*v_2(1)}{v_1(2) - v_2(1)}\right) \quad [2]$$

The idea behind this formula is that T3 is calculated in a way which tries to achieve that v1(3) equals v2(3), so that the BEMF signal approaches an ideal saw tooth function. The formula can be derived by assuming that the BEMF behaves linearly (which is not entirely true at start-up, but the approximation is better and better as the motor speed reaches its nominal value), and that the "ideal" moment for commutation is calculated as the moment where the two BEMF-lines (before and after the commutation) intersect. This yields a relation between v1(n) and v2(n) before and after the commutation, and v2(n−1) of the previous commutation.

Knowing t2 and T3, the time t3 when the third commutation C3 should be executed can then be calculated as t3=t2+T3. This formula can be generalized, and the time duration T(n+1) of each subsequent time-slot can be calculated using the following formula:

$$T(n+1) = T(n) * \left(1 - \frac{1}{2} * \frac{v_1(n) - v_2(n) - 2*v_2(n-1)}{v_1(n) - v_2(n-1)}\right) \quad [3]$$

where T(n) is the time period of the n-th motor cycle, T(n−1) is the time period of the preceding motor cycle, v1(n) and v2(n) are the BEMF-voltages measured slightly before and slightly after the n-th commutation (which is the most recent commutation), and v2(n−1) is the BEMF-voltage measured slightly after the (n−1)th commutation event (preceding the most recent commutation).

As can be seen in FIG. 8, due to the non-ideal moment of commutation, a discontinuity is seen between the back-EMF signals v1(.) and v2(.) slightly before and after each commutation event. However, as time increases, the difference between these values gradually decreases, which is exactly the purpose of the formulas above, and the rotor 17 gets more and more synchronous with the stator field, until the motor is running under (quasi) ideal conditions, whereby the BEMF-voltage-signal of subsequent motor states approaches more and more the ideal saw tooth shape shown in FIG. 6c or FIG. 7c.

It should be clear from the description of the method that start-up in the correct direction is guaranteed, and that, apart from the start-up behavior, the commutation moments are not far "off" from the ideal commutation moments. Also the method is extremely simple to implement, both in terms of hardware and software. In fact, this algorithm can e.g. be efficiently implemented as an interrupt routine, which can be executed on a controller 3 having a timer and timer interrupt facilities. The CPU 10 of this controller 3 should also be able to perform a multiplication and division operation, but as the formula [1], [2] or [3] only needs to be evaluated once per time-slot, a DSP with fast ADC's is not required and a relatively "slow" CPU (e.g. running at 5 MIPs or lower) may suffice. Even more important is that the algorithm is very robust for dynamic load changes, which is probably due to the fact that the BEMF is measured in each commutation interval, whereby the period T for each interval is calculated so as to regulate the error function v1(n)-v2(n) towards zero.

Figure 9:
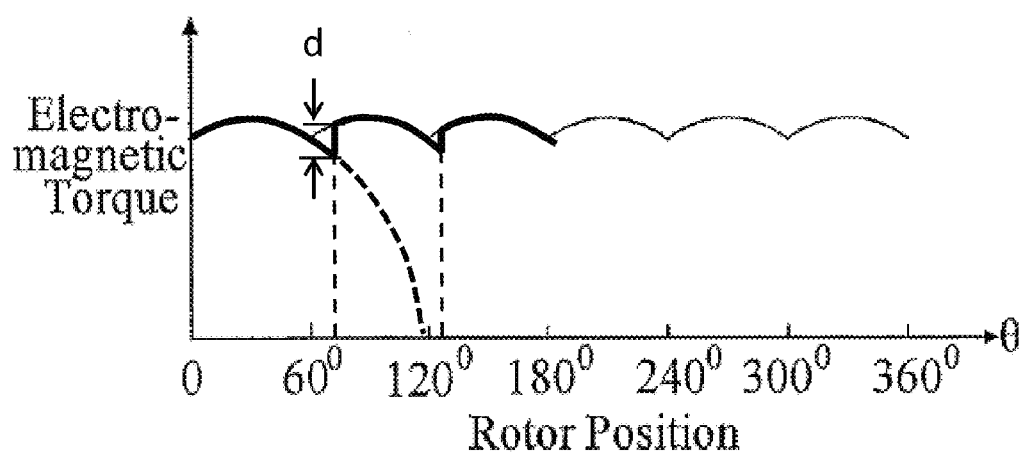
FIG. 9 shows an example of a torque waveform as may be experienced by a motor controlled by a method according to embodiments of the present invention.

FIG. 9 shows an example of a torque waveform as can be obtained when applying this method. Although the first and second commutation event shown in FIG. 9 both fall "after" the ideal commutation moment in this example, i.e. the commutation occurred "too late", in general the commutation events may fall "before" or "after" the ideal moment. However, since the torque function is "symmetric" around each working point, the net effect is similar, and as the moments between the "ideal" commutation events and the actual commutation events are not far "off", the average torque is only slightly less than the ideal torque.

While FIG. 8 shows relatively "undisturbed" BEMF-curves, it should be mentioned that, shortly after commutation, the current flowing through one of the two phase windings will gradually decay, and the current will gradually increase in the newly energized phase winding. As is known in the art, commutation events may cause voltage spikes due to the decay of the so called "fly-back" current, the energy of which is typically dissipated in bulk diodes or power transistors, while the voltage is clamped (e.g. to about GND−1V or VM+1V in the bulk diodes). During the decay period, the waveform present on the un-energized phase winding is therefore not a good indication for the BEMF, and thus not a good indication for the position of the rotor. However, as the clamping voltage is known, invalid BEMF-values (i.e. not representing true "BEMF-values") can easily be discarded in software. This is not shown in FIG. 8 for not obscuring the explanation of the basic algorithm.

Summarizing, the present invention provides a method, which can be implemented on the two electronic circuits shown in FIG. 3 and FIG. 4. It is noted that the algorithm is robust even against changes of the motor supply voltage VM, as may occur in a car environment, by working with a reference voltage that changes along with the supply voltage (and thus need not be constant).

On the other hand, in applications where the motor supply voltage VM is guaranteed to be constant, an advantage of the circuit of FIG. 4 over that of FIG. 3 is that half the supply voltage VM/2 will also be constant, and thus (in theory) only needs to be measured once, e.g. at start-up, whereas the virtual star voltage is not constant, but varies over time, and thus also needs to be sampled along with the BEMF-signal. Thus in the circuit of FIG. 4 the number of ADC conversions can be reduced, and thus also the power consumed by the controller 3.

The data of the motor sequence shown in Table 1 may e.g. be hardcoded, or may be stored in a memory 12. In applications where the direction of rotation is fixed, (e.g. a fan-application), some further optimizations can be implemented.

It is also noted that the supply voltage VDD and/or the motor supply voltage VM, may be generated from one or more batteries, and in case of an even number of such batteries, the half motor supply voltage VM/2 may e.g. be taken halfway between the first and the last battery.

The invention claimed is:

1. Method for driving a sensorless brushless DC motor or a permanent magnet synchronous motor in a predetermined direction, the motor comprising at least three stator windings connected in star configuration, and a permanent magnet rotor, the method comprising:
   a) determining a time period as the current time period, and energizing during the current time period two of the windings and leaving a third winding un-energized for rotating the rotor in a predetermined direction, based on a first motor state of an energizing sequence, corresponding to a known rotor position;
   b) measuring a first voltage representative for the back-EMF generated in the un-energized winding at a first time interval before expiry of the current time period;
   c) applying a commutation at expiry of the current time period so as to energize at least two of the windings while leaving a third winding un-energized according to a subsequent motor state of the energizing sequence;
   d) measuring a second voltage at a second time interval after the commutation, and calculating a subsequent time period based on at least the current time period and the measured first and second voltage;
   e) repeating steps b) and c) after replacing the current time period by the subsequent time period.

2. The method according to claim 1, wherein the first time period in step a) is a predetermined value.

3. The method according to claim 1, wherein the first time period in step a) is determined by monitoring a voltage representative for the back-EMF generated in the un-energized winding, and by determining the first time period T1 as the time instance when that voltage reaches a local extreme.

4. The method according to claim 1, wherein each subsequent time period is calculated based on the preceding time period by using a formula that is directed at reducing the difference between the first and the second voltage before and after the subsequent commutation.

5. The method according to claim 1, wherein the second time period immediately following the first time period immediately after motor start-up is calculated according to the formula:

$$T_2 = T_1 * \left(1 - \frac{1}{A} * \frac{v_1(1) - v_2(1)}{v_1(1)}\right);$$

wherein T2 is the second time period, T1 is the first time period, v1 is the first voltage measured before the first commutation and v2 is the second voltage measured after the first commutation, and 1/A is a predetermined value in the range of 0.25 to 0.75.

6. The method according to claim 1, wherein the subsequent time period is calculated according to the formula:

$$T(n+1) = T(n) * \left(1 - \frac{1}{A} * \frac{v_1(n) - v_2(n) - 2*v_2(n-1)}{v_1(n) - v_2(n-1)}\right);$$

wherein T(n) is the subsequent time period, T(n−1) is the current time period, v1(n) and v2(n) is the first resp. second voltage measured before and after the most recent commutation, and v2(n−1) is the second voltage measured after the commutation preceding the most recent commutation, and 1/A is a predetermined value in the range of 0.25 to 0.75.

7. The method according to claim 1, wherein the energizing of at least one of the windings is operated at least part of the time using a PWM-signal.

8. The method according to claim 1, wherein the energizing of the windings is operated at least part of the time using DC voltages.

9. An electrical circuit as can be used for performing the method of claim 1, the electrical circuit comprising:
   a BLDC motor or a PMSM motor, the motor comprising at least three stator windings connected in star configuration and a permanent magnet rotor;
   a controller connected to the motor, the controller comprising:
   at least three output pins connected to the windings of the motor for energizing at least two of the windings and for leaving a third winding un-energized;
   at least four input pins connected to the windings of the motor for measuring the voltage representative of the back-EMF generated in the un-energized winding, and connected to a reference signal;
   at least one analog to digital convertor for digitizing the measured voltage and for digitizing the reference signal;
   a calculation unit;
   wherein the controller is provided with an algorithm for performing the method according to claim.

10. A programmable controller as can be used in the electrical circuit of claim 9, comprising:
   the at least three output pins;
   the at least four input pins;
   the at least one analog to digital convertor;
   the calculation unit;
   a memory containing program code executable by the calculation unit and adapted for performing the method according to claim 1.

11. The programmable controller according to claim 10, further comprising a timer module.

12. A computer program product for executing the method of claim 1, When executed on a controller associated with a sensorless brushless DC motor or a permanent magnet synchronous motor comprising at least three stator windings connected in star configuration and a permanent magnet rotor.

13. A machine readable data storage storing the computer program product of claim 12.

* * * * *